US008304844B2

(12) United States Patent
Getman et al.

(10) Patent No.: US 8,304,844 B2
(45) Date of Patent: Nov. 6, 2012

(54) PRESSURE MEASURING DEVICE (75) Inventors: Igor Getman, Lorrach (DE); Dieter Stolze, Potsdam (DE); Anh Tuan Tham, Berlin (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 313 days.

(21) Appl. No.: 12/734,545

(22) PCT Filed: Nov. 7, 2008

(86) PCT No.: PCT/EP2008/065137
§ 371 (c)(1),
(2), (4) Date: May 7, 2010

(87) PCT Pub. No.: WO2009/060069
PCT Pub. Date: May 14, 2009

(65) Prior Publication Data
US 2010/0308426 A1 Dec. 9, 2010

(30) Foreign Application Priority Data

Nov. 9, 2007 (DE) .......................... 10 2007 053 859

(51) Int. Cl.
*H01L 27/14* (2006.01)
*H01L 29/84* (2006.01)
(52) U.S. Cl. ................. 257/414; 257/415; 257/E29.002
(58) Field of Classification Search .................. 257/414, 257/415, E29.002
See application file for complete search history.

(56) References Cited

U.S. PATENT DOCUMENTS

| 5,677,493 A | 10/1997 | Yamamoto |
| 6,066,882 A * | 5/2000 | Kato ............................. 257/414 |
| 2007/0013014 A1 | 1/2007 | Guo |

FOREIGN PATENT DOCUMENTS

| DE | 26 18 399 | 11/1976 |
| DE | 34 36 440 A1 | 4/1986 |
| DE | 196 38 373 A | 3/1997 |
| DE | 10 2004 041388 A1 | 3/2005 |
| DE | 10 2005 004 793 A1 | 8/2005 |
| EP | 0 986 098 A1 | 3/2000 |
| JP | 06331473 A | 12/1994 |
| JP | 09 325 082 A1 | 12/1997 |
| JP | 10 332 505 A | 12/1998 |
| JP | 2001 004473 A | 1/2001 |
| JP | 2007 278 788 A | 10/2007 |

* cited by examiner

*Primary Examiner* — Michelle Mandala
(74) *Attorney, Agent, or Firm* — Bacon & Thomas, PLLC (57) ABSTRACT

A pressure measuring device having a pedestal, an intermediate piece of semiconductor arranged on the pedestal and, connected with the pedestal and arranged on the intermediate piece and connected with the intermediate piece, a semiconductor pressure sensor having a support and a measuring membrane, or diaphragm. The pressure measuring device offers reliable protection of the sensitive measuring membrane, or diaphragm, against mechanical distortions. Provided extending in the interior of the intermediate piece is an annular cavity, which surrounds a first cylindrical section and, pedestal end thereof, a second cylindrical section of the intermediate piece. The second cylindrical section has a greater outer diameter than the first cylindrical section. The cavity is open on an end of the intermediate piece toward the pedestal. The second cylindrical section has an end face facing the pedestal and lying on an end face of the pedestal, for forming a connecting area, via which the intermediate piece is mechanically connected with the pedestal.

6 Claims, 5 Drawing Sheets

PRESSURE MEASURING DEVICE

TECHNICAL FIELD

The invention relates to a pressure measuring device having a semiconductor pressure sensor mounted on a pedestal.

BACKGROUND DISCUSSION

Pressure measuring devices serve for registering pressures, especially absolute pressures, relative pressures and pressure differences, and are used in industrial measurements technology.

In pressure measuring technology, so called semiconductor pressure sensors are a welcome option. Semiconductor sensors are today regularly produced based on silicon, e.g. by applying Silicon-On-Insulator (SOI) technology. Such are embodied in the form of a pressure sensor chip, which typically involves a support and a measuring membrane, or diaphragm, arranged on the support. In measurement operation, a first pressure is supplied to a first side of the measuring membrane, or diaphragm.

For registering pressure differences, a second side of the measuring membrane, or diaphragm, lying opposite to the first side is supplied with a second pressure. The pressure difference existing between the first and second pressures effects a deflection of the measuring membrane, or diaphragm, dependent on the pressure difference to be measured.

For registering relative pressures, the second side of the measuring membrane, or diaphragm, is supplied a reference pressure, e.g. ambient pressure. The existing pressure difference between the first pressure and the reference pressure effects a deflection of the measuring membrane, or diaphragm, dependent on the relative pressure to be measured.

For registering absolute pressures, there is usually provided under the measuring membrane, or diaphragm, on its second side facing away from the first side, a sealed, evacuated chamber. Therewith, the first pressure acting on the first side of the measuring membrane, or diaphragm, effects a deflection of the measuring membrane, or diaphragm, dependent on the absolute pressure to be measured.

The resulting deflection of the measuring membrane, or diaphragm, is, in all three cases, registered via sensor elements, e.g. piezoresistive resistors, arranged on the measuring membrane, or diaphragm, and converted into an electrical output signal, that then is available for additional processing and/or evaluation.

Semiconductor pressure sensors are very sensitive and are therefore applied in a housing, via which supply of the respective pressures, output of measurement results and mounting of the pressure measuring device at the measuring location occurs.

In such case, the semiconductor pressure sensor is mounted, for example, on a pedestal located in the housing, in such a manner that a first side of the measuring membrane, or diaphragm, facing away from the pedestal, faces into a first measuring chamber located in the housing. This first measuring chamber receives the first pressure. In the case of difference, or relative, pressure sensors, supplementally, the second pressure, or the reference pressure, is supplied to the second side of the measuring membrane, or diaphragm, via a bore extending in the interior of the pedestal. The bore opens into a second measuring chamber enclosed by the measuring membrane, or diaphragm, support, under the measuring membrane, or diaphragm. In the case of absolute pressure measuring devices, the chamber located under the measuring membrane, or diaphragm, is sealed and evacuated. The supply of the first and second pressures occurs, for example, via pressure transfer means integrated into the housing, or connected in front thereof, and filled with a pressure transmitting liquid. The supply of the reference pressure occurs, for example, via a reference pressure supply integrated into the housing.

The pedestal is, for example, a cylindrical protrusion, which is embodied as an integral component of the housing or as a separate component secured in the housing.

In order to assure a sufficiently high mechanical stability, housing and pedestal are composed of a mechanically stable material, especially metal.

Pedestal and semiconductor pressure sensor are composed therewith unavoidably of different materials, which have very different physical properties, especially different coefficients of thermal expansion. Due to the mechanical connection between the pedestal and the semiconductor pressure sensor, consequently, mechanical stresses can occur, which affect the transfer behavior of the measuring membrane, or diaphragm, and therewith the achievable accuracy of measurement. Reproducibility of measurements worsens. This is true especially in the case of temperature dependent stresses.

For reducing the arising stresses, usually an intermediate piece is inserted between the pedestal and the semiconductor pressure sensor. The intermediate piece is composed of the same material as the semiconductor pressure sensor. Also then, however, there still occurs, because of the different coefficients of thermal expansion of pedestal and intermediate piece, especially temperature dependent, mechanical distortions, which affects the transfer behavior of the measuring membrane, or diaphragm.

Figure 1:
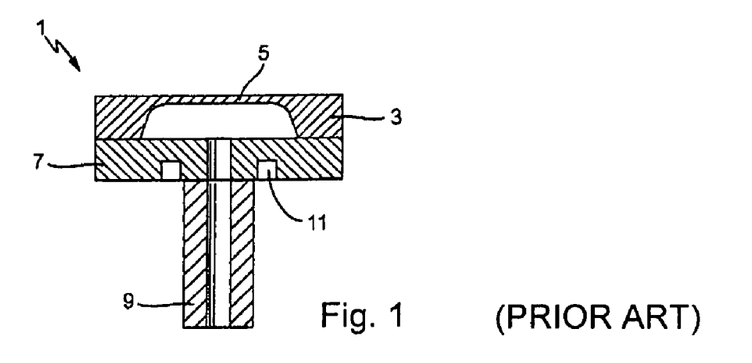
FIG. 1 is a section through a pressure measuring device known from the state of the art.

In German Patent DE 34 36 440, a solution for this problem is described, which enables a reducing of the disadvantageous effects of the mechanical stresses. Such a measuring unit is shown in FIG. 1. It comprises a semiconductor pressure sensor 1 having a measuring membrane, or diaphragm, 5 carried by a support 3. The support 3 is mounted on an intermediate piece 7 that is arranged on a metal pedestal 9. A bore is provided, which leads through the pedestal 9 and the intermediate piece 7 and into a measuring chamber enclosed under the measuring membrane, or diaphragm, 5. The intermediate piece 7 is circularly disk shaped and has an outer diameter matched to the outer diameter of the semiconductor pressure sensor 1. The pedestal 9 is hollow cylindrically embodied and includes a markedly smaller outer diameter. For reducing mechanical stresses, there is provided on the underside of the intermediate piece 7 toward the pedestal 9 a ring-shaped groove 11, which borders directly on the pedestal 9. The groove 11 serves to absorb mechanical stresses caused by the connection between pedestal 9 and intermediate piece 7 and to prevent the mechanical stresses from reaching the measuring membrane, or diaphragm, 5.

This measuring device has, however, the disadvantage, that the mechanical stability of the measuring unit limited by the bond strength of the connection between the pedestal 9 and the intermediate piece 7.

Especially, in the case of pressure difference measuring systems, the maximum pressure, which can be supplied through the pedestal to the measuring membrane, or diaphragm, is limited.

From safety reasons, this connection must assure that the semiconductor pressure sensor remains on the pedestal, when a positive pressure is supplied via the pedestal.

The bond strength of the connection between the pedestal and the intermediate support could theoretically be improved by enlarging the available connecting area between the pedestal and the intermediate piece. This leads, however, to the fact that the wall thickness between the bore and the annular groove rises, and the position of the annular groove is shifted radially outwardly. In this way, the annular groove loses, however, its effect as regards mechanical decoupling. This effect is especially marked in the case of pressure measuring devices designed for higher pressure measuring ranges, since these typically have semiconductor pressure sensors with measuring membranes, or diaphragms, of smaller diameter.

Alternatively or supplementally, the thickness of the intermediate piece could be increased and/or the depth of the groove made greater. A deeper groove leads, however, to reduced fracture safety. Increasing the thickness of the intermediate piece leads, in turn, to an increasing of the manufacturing costs, especially when the intermediate piece is made of silicon.

SUMMARY OF THE INVENTION

It is an object of the invention to provide a pressure measuring device having a semiconductor pressure sensor mounted on a pedestal and offering reliable protection of the sensitive measuring membrane, or diaphragm, against mechanical distortions.

For this, the invention resides in a pressure measuring device having
  a pedestal,
  an intermediate piece of semiconductor arranged on the pedestal and connected with the pedestal, and
  a semiconductor pressure sensor arranged on the intermediate piece and connected with the intermediate piece, and having
    a support and a measuring membrane, or diaphragm, wherein,
  extending in the interior of the intermediate piece, an annular cavity is provided,
    which surrounds a first cylindrical section and, pedestal end thereof, a second cylindrical section of the intermediate piece, wherein the second cylindrical section has a greater outer diameter than the first cylindrical section, and
    which is open on an end of the intermediate piece toward the pedestal, and
  the second cylindrical section has, toward the pedestal and lying on an exposed end face of the pedestal, an end face, which forms a connecting area, via which the intermediate piece is mechanically connected with the pedestal.

In a first embodiment, of the invention, the pressure measuring device serves for registering pressure differences or relative pressures, wherein
  in the intermediate piece, a centrally arranged bore is provided extending parallel to a longitudinal axis of the intermediate piece and opening at a pedestal end,
  the bore extends through the intermediate piece and opens into a pressure measuring chamber enclosed by the measuring membrane, or diaphragm, its support and the intermediate piece under the measuring membrane, or diaphragm,
  in the pedestal, there is provided a centrally arranged, further bore extending parallel to the longitudinal axis of the pedestal, and communicating with the bore in the intermediate piece, and
  the bore in the intermediate piece and the therewith communicating bore in the pedestal form a pressure supply line.

In a second embodiment, of the invention, the pressure measuring device serves for registering absolute pressures. It includes, under the measuring membrane, or diaphragm, an evacuated chamber completely sealed by the measuring membrane, or diaphragm, its support and the intermediate piece. Additionally, there is provided in the intermediate piece a blind bore extending parallel to the longitudinal axis of the intermediate piece and opening at a pedestal end.

In a further development, the outer diameter of the first cylindrical section exposed by the cavity is smaller than the outer diameter of the measuring membrane, or diaphragm.

In a preferred embodiment, the semiconductor pressure sensor is a sensor based on silicon. The intermediate piece is composed of silicon, and the pedestal is composed of metal or ceramic.

In an additional embodiment, the intermediate piece and the pedestal are mechanically connected with one another by adhesive or solder.

Furthermore, the invention resides in a method for manufacture of a pressure measuring device of the invention, wherein the intermediate piece is produced from a first, a second and a third silicon chip, or layer, wherein
  the first and second silicon chips are set flush with one another and connected with one another by bonding,
  an annular region of the second silicon chip arranged concentrically with the chip center is etched away,
    wherein this region has an outer diameter, which the outer diameter of the cavity, and an inner diameter, which equals the outer diameter of the first cylindrical section of the intermediate piece,
  a third silicon chip is flushly superimposed on the second silicon chip and connected with such by bonding,
  a hollow cylindrical region of the third silicon chip arranged concentrically with the chip center is etched away,
    wherein this region has an outer diameter, which equals the outer diameter of the cavity, and an inner diameter, which equals the outer diameter of the second cylindrical section of the intermediate piece, and
  the semiconductor pressure sensor is secured on a side of the first silicon chip facing away from the second silicon chip.

In a further development of the method, the first and/or the second silicon chip has on one or on both outer surfaces an oxide layer, and the first and second silicon chips are connected with one another by high temperature, wafer bonding, wherein at least one of the oxide layers is located between the first and second silicon chips. Likewise, the second and/or the third silicon chip has on one or on both outer surfaces an oxide layer, and the second and third silicon chips are connected with one another by high temperature, wafer bonding, wherein at least one of the oxide layers is located between the second and third silicon chips.

In a further development of the method, the securement of the semiconductor pressure sensor occurs in such a manner, that
  the side of the first silicon chip facing away from the second silicon chip is chemically polished, especially by means of isotropic etching, and
  the semiconductor pressure sensor is secured to the polished surface by means of low temperature, silicon direct bonding.

In a first variant of the method,
  the side of the third silicon chip facing away from the second silicon chip is chemically polished, especially by means of isotropic etching, and
  the intermediate piece is adhered to the pedestal by means of a silicone rubber.

In a second variant of the method, the intermediate piece is adhered to the pedestal by means of an epoxide resin adhesive.

Through the forming of the invention of the cavity, a reliable mechanical decoupling of the measuring membrane, or diaphragm, is assured. Especially, effects of mechanical distortions on the measuring characteristics of the measuring membrane, or diaphragm, caused by the connection between the pedestal and the intermediate piece are largely prevented.

An essential advantage of the pressure measuring device of the invention is that it assures a high mechanical stability. Through the subdividing of the invention of the cavity in the intermediate piece into a cavity surrounding the thin first cylindrical section and a groove bordering thereon on the pedestal end and surrounding the thicker, second cylindrical section, on the pedestal end a large connecting area is available for the mechanical securement of the intermediate piece to the pedestal. At the same time, there is provided by the pedestal end opening of the cavity and the comparatively thin, first cylindrical section a reliable decoupling of the measuring membrane, or diaphragm. Mechanical distortions caused by the connection between the pedestal and the intermediate piece have therewith practically no effects any longer on the transfer behavior and the measuring characteristics of the measuring membrane, or diaphragm. Accordingly, the achievable accuracy of measurement is assured with a high, long term stability and high reproducibility.

BRIEF DESCRIPTION OF THE DRAWINGS

The invention and its advantages will now be explained in greater detail on the basis of the figures of the drawing, in which two examples of embodiments are shown. Equal elements are provided in the figures with the equal reference characters. The figures show as follows.

DETAILED DISCUSSION IN CONJUNCTION WITH THE DRAWINGS

Figure 2:
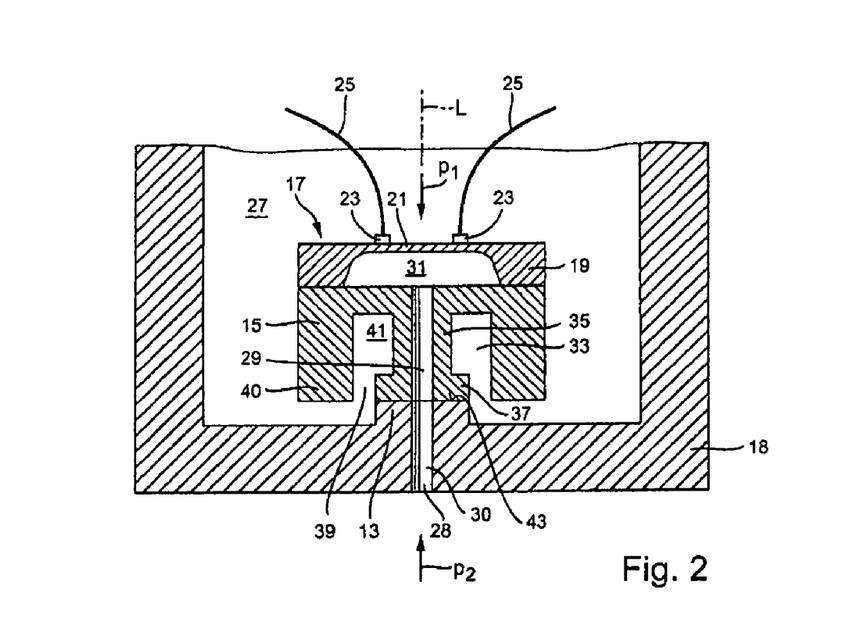
FIG. 2 is a section through a pressure measuring device of the invention for registering relative pressures or pressure differences.

FIG. 2 shows a section through a first example of an embodiment of a pressure measuring device of the invention. The here shown variant of the invention is suitable for registering pressure differences as well as for registering relative pressures. This pressure measuring device includes a metal pedestal 13, an intermediate piece 15 of semiconductor arranged on the pedestal 13 and connected with the pedestal 13, and a semiconductor pressure sensor 17 arranged on the intermediate piece 15 and connected with the intermediate piece 15. The intermediate piece 15 is composed, preferably, of the same material as that used for the manufacture of the semiconductor pressure sensor 17, especially silicon.

The pedestal 13 is composed, for example, of metal or ceramic and serves for mounting the semiconductor pressure sensor 17 in a housing 18, which is shown here only partially. Pedestal 13 is, for example, a cylindrical protrusion, which can be embodied as an integral component of the housing 18 or as a separate component secured in the housing 18.

The semiconductor pressure sensor 17 is a pressure sensor chip based on silicon, and includes a support 19 and a measuring membrane, or diaphragm, 21 carried on the support 19. Support 19 includes a disk-shaped end face, which lies on an equally shaped, outer edge of the intermediate piece 15 and is connected with such.

In measurement operation, a first pressure p1 is supplied to a first side of the measuring membrane, or diaphragm, 21, while a second pressure p2 is supplied to the oppositely lying, second side of the measuring membrane, or diaphragm, 21. In the case of a relative pressure measurement, the first pressure p1 corresponds to the pressure to be measured and the second pressure p2 to the reference pressure, to which the pressure to be measured is to be referenced. In the case of a pressure difference measurement, the first and second pressure p1, p2, are the two pressures, whose pressure difference is to be measured. The pressure difference $\Delta p = p1 - p2$ existing between the first and second pressures p1, p2 effects a deflection of the measuring membrane, or diaphragm, 21 dependent on the pressure difference to be measured, or on the relative pressure to be measured. The deflection is registered via sensor elements 23, e.g. piezoresistive resistors, arranged on the measuring membrane, or diaphragm, 21, and transduced into an electrical output signal. The output signal is then available via connection lines 25 connected to the sensor elements 21 for additional processing and/or evaluation.

The first pressure p1 is externally supplied to the first side of the measuring membrane, or diaphragm, 21. This can happen in various ways. In the illustrated example, the semiconductor pressure sensor 17 is mounted in such a manner on the pedestal 13 located in the housing 18, that the first side of the measuring membrane, or diaphragm, 21 facing away from the pedestal 13 bounds in the housing 18 an inner space 27, to which the first pressure p1 is supplied.

The second pressure p2 is supplied to the second side of the measuring membrane, or diaphragm, 21 via a pressure supply line 28, which extends through the pedestal 13 and the intermediate piece 15 and opens into a pressure measuring chamber 31 under the measuring membrane, or diaphragm, 21 enclosed by the support 19 and the intermediate piece 15. The pressure supply line 28 is formed by a bore 29 in the intermediate piece 15 and a thereto adjoining, further bore 30 in the pedestal 13. Bore 29 is arranged centrally in the intermediate piece 15. It extends parallel to the longitudinal axis L of the intermediate piece 15 and is open on the pedestal end. Bore 29 leads through the intermediate piece 15 and opens into the pressure measuring chamber 31 located under the measuring membrane, or diaphragm, 21 and enclosed by the support 19 and the intermediate piece 15. The further bore 30 leads through the pedestal 13. It is arranged centrally in the pedestal 13, extends parallel to the longitudinal axis L of the pedestal 13, and opens into the bore 29 of the intermediate piece 15. Both bores 29, 30 extend along the longitudinal axis L of the components in which they are located, such coinciding with the longitudinal axis L of the measuring unit and extending, preferably, toward the center of the measuring membrane, or diaphragm, 21.

Figure 8:
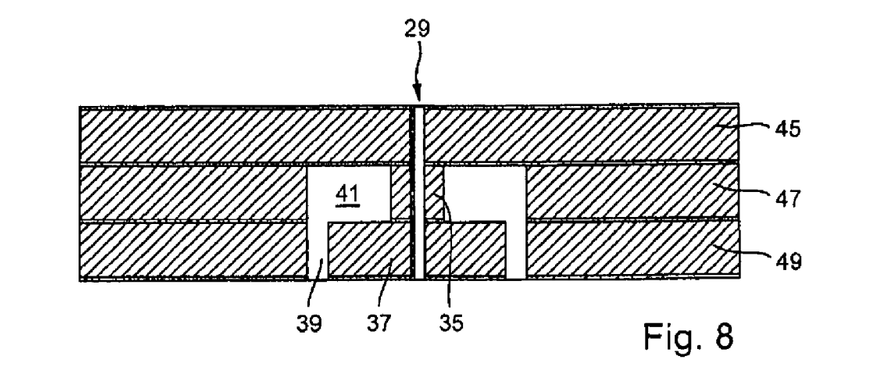
FIG. 8 is the composite of FIG. 7, wherein the outer two oxide layers have been removed.
Figure 9:
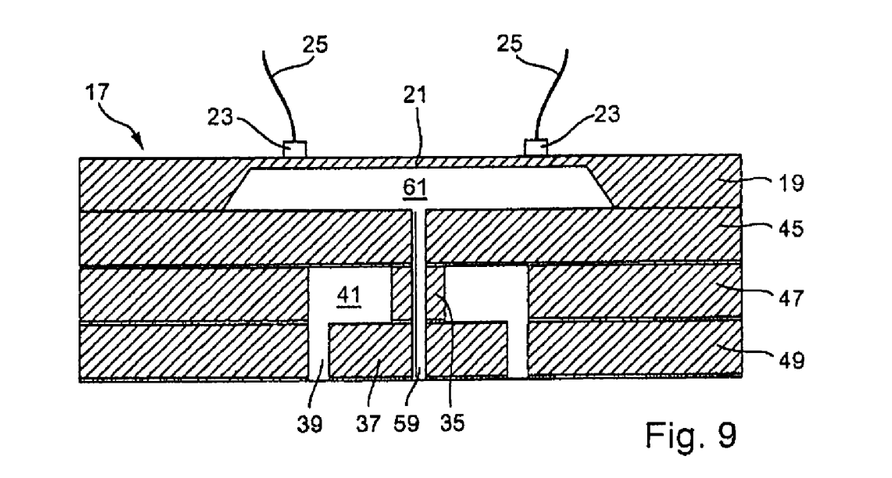
FIG. 9 is the intermediate piece of the pressure measuring device illustrated in FIG. 2 having the semiconductor pressure sensor mounted thereon.

According to the invention, the intermediate piece 15 has, extending in the interior of the intermediate piece 15, an annular cavity 33, which is open on an end of the intermediate piece 15 toward the pedestal 13. FIG. 8 shows, in detail, the intermediate piece 15 of the example of an embodiment illustrated in FIG. 2. The cavity 33 is embodied in such a manner that, through it, there arises in the interior of the cavity 33 a first cylindrical section 0.35 of the intermediate piece 15 and a thereto adjoining, second cylindrical section 37 on the pedestal end. The second cylindrical section 37 has a greater outer diameter than the first cylindrical section 35. The cavity 33 surrounds the thinner, first cylindrical section 35 and the thereto adjoining, thicker, second cylindrical section 37 on the pedestal end. To this end, the cavity 33 is formed by a cylindrical groove 39 concentrically surrounding the bore 29 and by a hollow cylindrically shaped cavity 41 bordering the groove 39 on the side of the groove 39 away from the pedestal 13. The outer diameter of cavity 41 equals the outer diameter of the groove 39, and its inner diameter is smaller than the inner diameter of the groove 39. Correspondingly, the outer diameter of the first section 35 exposed by the cavity 33 is smaller than the outer diameter of the second cylindrical section 37 exposed by the cavity 33.

The second section 37 has a disk shaped, end face 43 facing the pedestal 13 and lying on an equally shaped end face of the pedestal 13. End face 43 forms a connecting area, via which the intermediate piece 15 is mechanically connected with the pedestal 13. The connection occurs, preferably, by means of adhesive or solder. In such case, the outer diameter of the pedestal 13, preferably, equals the outer diameter of the second section 37, so that the cavity 33 is downwardly open via the pedestal end opening of the groove 39. Because of the cavity 33, an outer, third section 40 extends freely toward the pedestal and is separated from the first and second sections 35, 37.

Through the form of the invention for the cavity 33, it is achieved, that the outer diameter of the pedestal end, second section 37 can be dimensioned independently of the outer diameter of the first section 35. In such case, the thinner first section 35, together with the pedestal end opening of the cavity 33, effects a reliable decoupling of the measuring membrane, or diaphragm, 21 from mechanical stresses caused by the mechanical connection of the intermediate piece 15 with the pedestal 13. Preferably, the outer diameter of the first section 35 is smaller than the outer diameter of the measuring membrane, or diaphragm, 21.

The larger outer diameter of the second section 37 assures that a large connecting area is available for the mechanical connection between the pedestal 13 and the intermediate piece 15.

Manufacture of pressure measuring devices of the invention occurs, preferably, by applying processes used in MEMS technology. The manufacturing process of the invention will now be explained in greater detail first on the basis of the pressure measuring device illustrated in FIG. 2 for measuring difference, or relative, pressures.

The main topic of interest is, in such case, the manufacture of the intermediate piece 15. The intermediate piece 15 is, preferably, constructed from three equally shaped, silicon chips 45, 47, 49. The faces of the silicon chips 45, 47, 49 are matched to the geometry of the semiconductor pressure sensor 17. I.e., in the case of a semiconductor pressure sensor 17 of rectangular outline, silicon chips 45, 47, 49 with rectangular faces are applied, while in the case a semiconductor pressure sensor 17 of circular outline, correspondingly chips with circularly shaped faces are used. The silicon chips 45, 47, 49 have, for example, a diameter, or a side length, of about 100 mm and a thickness of about 500 µm.

In the here described example of an embodiment, all silicon chips 45, 47, 49 are oxidized on both sides, so that both faces have an oxide layer 51. This is, however, not absolutely required.

Figure 3:
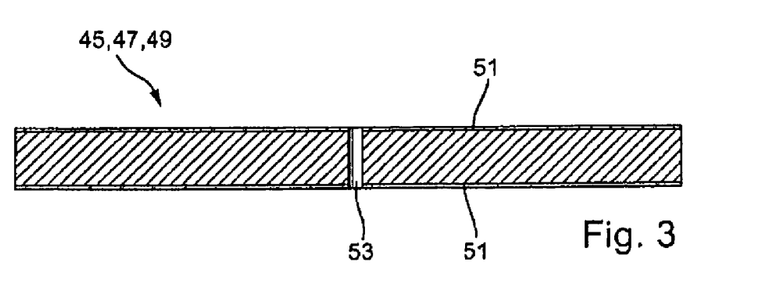
FIG. 3 is a silicon chip having a central bore and applied for the manufacture of the pressure measuring device of the invention, the chip being oxidized on both sides.

Then, each silicon chip 45, 47, 49 is provided with a central bore 53. This state is shown in FIG. 3. The central bores 53 can be produced mechanically. Preferably, however, they are produced by a dry, chemical etching procedure.

Figure 4:
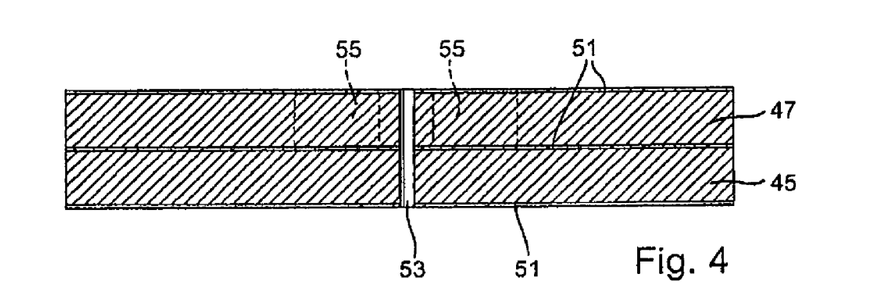
FIG. 4 is a first silicon chip and a second silicon chip connected together.

Subsequently, two of the silicon chips, here the first silicon chip 45 and the second silicon chip 47 are set flush with one another and connected with one another by bonding. This is shown in FIG. 4. The alignment of the two silicon chips 45, 47 occurs, in such case, preferably, via the central bores 53 of the two silicon chips 45, 47.

The bonded connection is accomplished, preferably, by means of wafer direct bonding at high temperature, especially at a temperature of 1000° C. to 1100° C., with at least one oxide layer 51 being located between the first and second silicon chips 45, 47.

In a subsequent working step, a ring shaped region 55 of the second silicon chip 47 arranged concentrically with the chip center is etched away. The region 55 is shown dashed in FIG. 4. It has an outer diameter, which equals the outer diameter of the cavity 33, and has an inner diameter, which equals the outer diameter of the thinner, first cylindrical section 35 of the intermediate piece 15.

For removing the region 55, preferably, the outer oxide layer 51 present on the side of the second silicon chip 47 facing away from the first silicon chip 45 is structured by means of lithography and the region 55 removed by means of a dry, chemical, deep etching. This offers the advantage, that the outer oxide layer 51 is available as mask for the following dry, deep etching. A further advantage is that the oxide layers 51 enclosed between the first and second silicon chips 45, 47 form an effective etch stop, due to the high etching selectivity between silicon and silicon oxide.

Figure 5:
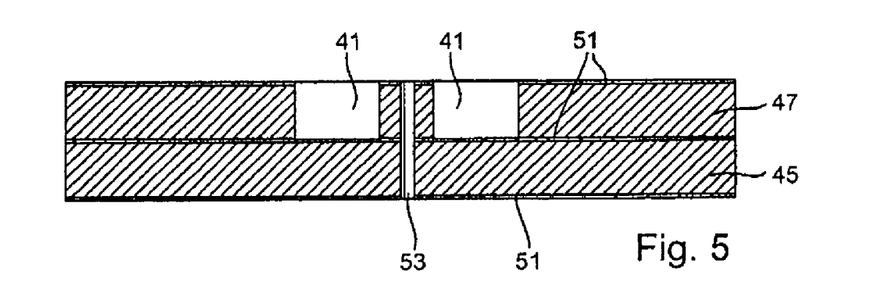
FIG. 5 is the composite illustrated in FIG. 4, wherein a cavity has been etched in the second silicon chip.

Through the removing of the region 55, there arises the ring shaped cavity 41 shown in FIG. 5, which, in the end state, surrounds the first cylindrical section 35.

Figure 6:
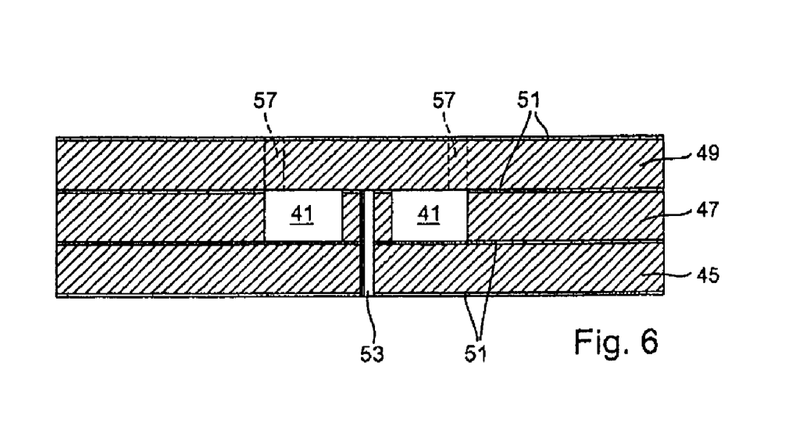
FIG. 6 is the composite of FIG. 5 with a third silicon chip applied thereon.

Then, the third silicon chip 49 is flushly superimposed on the second silicon chip 47, as shown in FIG. 6. The third silicon chip 49 lies then on the side of the second silicon chip 47 facing away from the first silicon chip 45. The alignment of the third silicon chip 49 relative to the composite formed by the two other silicon chips 45, 47 occurs, in such case, preferably, via the central bores 53 of the silicon chips 45, 47, 49. The third silicon chip 49 is next connected with the second silicon chip 47 by bonding. The bonded connection is accomplished, also here, preferably, by means of wafer direct bonding at high temperature, especially at a temperature of 1000° C. to 1100° C., wherein at least oxide layer 51 is located between the second and third silicon chips 47, 49. The total thickness of the wafer composite formed in this way amounts now to, for example, about 1.5 mm.

In a subsequent working step, a hollow cylindrical region 57 of the third silicon chip 49 arranged concentrically with the chip center is etched away. Region 57 is shown dashed in FIG. 6. Region 57 has an outer diameter, which equals the outer diameter of the cavity 33, and an inner diameter, which equals the outer diameter of the second cylindrical section 37.

For removing region 57, preferably, the outer oxide layer 51 present on the side of the third silicon chip 49 facing away from the second silicon chip 47 is structured by means of lithography and the region 57 removed by means of dry, chemical, deep etching. This offers the advantage, that the outer oxide layer 51 is available as mask for the following dry, deep etching.

Figure 7:
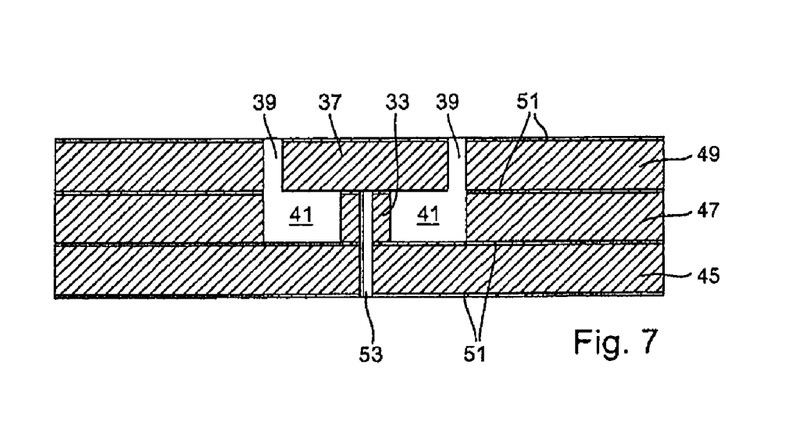
FIG. 7 is the composite of FIG. 6 with a groove etched into the third silicon chip.

Through the removal of the region 57, there arises the cylindrical groove 39 shown in FIG. 7, which in the end state surrounds the second cylindrical section 37 of the intermediate piece 15. The cylindrical groove 39 forms together with the thereto adjoining ring shaped cavity 41 the cavity 33.

The bore 29 is formed by the central bores 53 of the silicon chips 45, 47, 49 adjoining one another in the end state. The diameter of the bore 29 amounts to, preferably, at least 0.8 mm and the wall thicknesses of the first and second cylindrical sections 35, 37 surrounding the bore 29 to, preferably, at least 2 mm.

Then the semiconductor, pressure difference sensor 17 is secured on a side of the first silicon chip 45 facing away from the second silicon chip 47. For this, preferably, a bonding method is applied. The choice of method is, in such case, dependent on the temperature resistance of the semiconductor pressure sensor 17. If the semiconductor pressure sensor 17 is in this manufacturing stage an already completely structured and metallized chip, then the connection occurs, preferably, by means of low temperature, silicon direct bonding. For this, the oxide layer 51 located on the side of the first silicon chip 45 facing away from the second silicon chip 47 is removed and the side of the first silicon chip 45 facing away from the second silicon chip 47 chemically polished. This happens, preferably, by means of successive isotropic, wet, or dry, chemical etching.

Then, the semiconductor pressure sensor 17 is secured on the polished surface by means of low temperature, silicon direct bonding at temperatures below 400° C.

If the semiconductor pressure sensor 17 can, in contrast, also be structured and metallized after its securement on the intermediate piece 15, then the connection occurs, preferably, by means of high temperature, wafer bonding, wherein, for this, the oxide layer 51 is to be provided on the side of the first silicon chip 45 toward the semiconductor pressure sensor 17. This method offers the advantage, that the joining surfaces do not have to fulfill the high requirements required for the direct bonding, and that a stronger bond is achieved.

Then, the intermediate piece 15 is adhered or soldered onto the pedestal 13.

The adhesion can occur, for example, by means of an epoxide resin adhesive. For this, the oxide layer 51 located, in given cases, on the side of the third silicon chip 49 facing away from the second silicon chip 47 is removed, and the intermediate piece 15 adhered onto the pedestal 13 with epoxide resin. The oxide layer 51 can, for example, be removed by means of an etching procedure. In such case, preferably, an etching method is selected, that produces a rough surface, since epoxide resin adhesive adheres better on rough surfaces.

The adhesion can, however, also occur by means of a silicone rubber. For this, the oxide layer 51 located, in given cases, on the side of the third silicon chip 49 facing away from the second silicon chip 47 is removed, and the side of the third silicon chip 49 facing away from the second silicon chip 47 chemically polished. Both processes are, preferably, executed in a single working step by means of a successive wet, or dry, chemical, isotropic etching. Then, the intermediate piece 15 is adhered to the pedestal 13 with silicone rubber.

Silicone rubber is used, preferably, for pressure measuring devices registering pressures of less than 100 mbar. Epoxide resin adhesive is, in contrast, also applicable for higher pressure measuring ranges.

When on both external sides of the composite illustrated in FIG. 7 there are oxide layers 51 to be removed, the removal of both oxide layers 51 is preferably conducted in one working step, before the semiconductor pressure sensor 17 is applied. The result is shown in FIG. 8.

Figure 10:
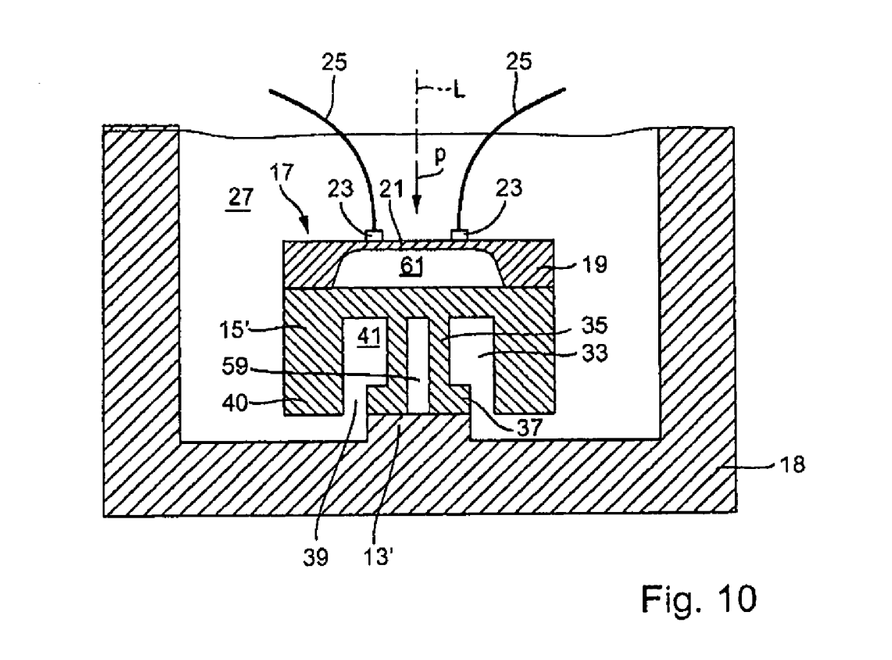
FIG. 10 is a pressure measuring device of the invention for registering absolute pressures.

The invention is not limited to pressure measuring devices registering pressure differences or relative pressures. It is applicable in analogous manner also in pressure measuring devices registering absolute pressures. FIG. 10 shows an example of an embodiment of a pressure measuring device of the invention registering absolute pressures. Due to the large agreement with the earlier described example of an embodiment, subsequently only differences are explained in greater detail.

The basic construction is identical to that illustrated in FIG. 2.

Accordingly, the pressure measuring device shown in FIG. 10 for registering absolute pressures includes a pedestal 13', an intermediate piece 15' of semiconductor arranged on the pedestal 13' and connected with the pedestal 13', and a semiconductor pressure sensor 17, with support 19 and measuring membrane, or diaphragm, 21, arranged on the intermediate piece 15' and connected with the intermediate piece 15'.

In contrast to the earlier described example of an embodiment, supplied to the measuring membrane, or diaphragm, 21 is only the pressure p to be measured. This occurs in the same manner as the supply of the pressure p1 in the preceding example of an embodiment. Accordingly, a pressure supply line 28 extending through the pedestal 13' and the intermediate piece 15' into a pressure measuring chamber 31 is not required. Instead, there is located under the measuring membrane, or diaphragm, 21 an evacuated chamber 61 completely sealed by the measuring membrane, or diaphragm, 21, its support 19 and the intermediate piece 15'. A bore in the intermediate piece 15' is not required for pressure supply. Since the bore, however, amplifies the mechanical decoupling, a bore in the intermediate piece 15' can be provided also in the case of absolute pressure measuring devices. In contrast to the bore 29, this bore is here a blind bore 59 opening on the pedestal end.

For mechanical decoupling of the measuring membrane, or diaphragm, 21 from temperature dependent distortions, as can be brought about by the mechanical connection between the pedestal 13' and the intermediate piece 15', also here, according to the invention, there is provided extending in the interior of the intermediate piece 15' an annular cavity 33, which is formed in such a manner, that a thin, first cylindrical section 35 and a pedestal end thereto adjoining, thicker second cylindrical section 37 arise. The cavity 33 surrounds the two sections 35, 37, and is open on a side of the intermediate piece 15 facing the pedestal 13'. Pedestal 13' and intermediate piece 15' are mechanically connected with one another in the manner already earlier described on the basis of the example of an embodiment illustrated in FIG. 2. In contrast to the earlier described example of an embodiment, the bore 30 provided in the preceding example of an embodiment in the pedestal 13' can be omitted.

The manufacturing process occurs analogously to the earlier described manufacturing process for the pressure measuring transducer illustrated in FIG. 2. The single difference is that, instead of the first silicon chip 45, a first silicon chip 45' having an oxide layer 51 on both sides is used.

Figure 11:
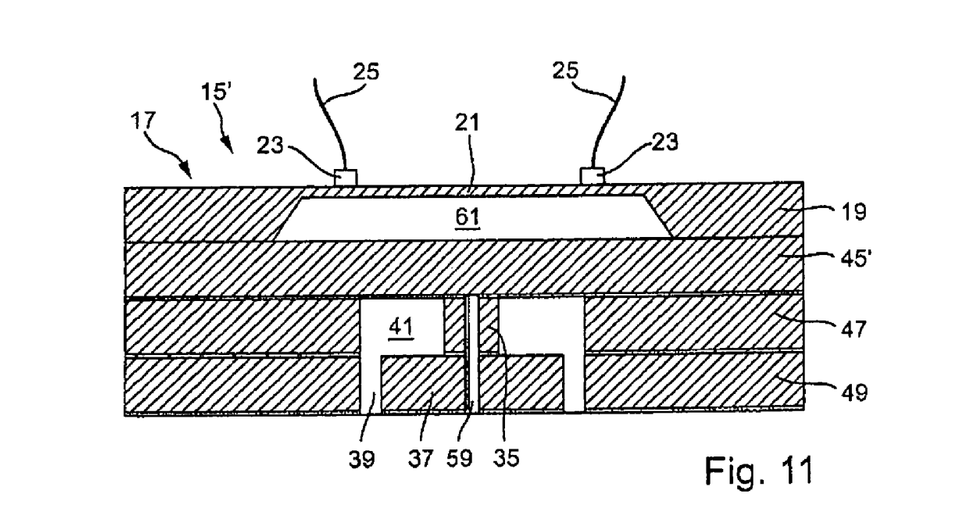
FIG. 11 is the intermediate piece of the pressure measuring device of FIG. 10, together with the semiconductor pressure sensor mounted thereon.

Silicon chip 45' has no central bore 53. This silicon chip 45' forms the rear wall of the blind bore 59 in the intermediate piece 15' and closes the chamber 61 on the pedestal side completely. The resulting layer composite forming the intermediate piece 15' is shown in FIG. 11 together with the thereon arranged, semiconductor pressure sensor 17.

The invention claimed is:

1. A pressure measuring device, comprising:
   a pedestal;
   an intermediate piece of semiconductor arranged on said pedestal and connected with said pedestal; and,
   a semiconductor pressure sensor arranged on said intermediate piece and connected with said intermediate piece, said semiconductor pressure sensor having a support and a measuring membrane, or diaphragm; wherein:
   an annular cavity extends into the interior of said intermediate piece which surrounds a first cylindrical section and, pedestal end thereof, and a second cylindrical section of said intermediate piece, said second cylindrical section having a greater outer diameter than said first cylindrical section, and which is open on an end of said intermediate piece toward said pedestal; and
   said second cylindrical section has, facing said pedestal and lying on an end face of said pedestal, an end face, which forms a connecting area, via which said intermediate piece is mechanically connected with said pedestal.

2. The pressure measuring device as claimed in claim 1, for registering pressure differences or relative pressures, wherein:
   in said intermediate piece, a centrally arranged bore is provided extending parallel to its longitudinal axis and opening pedestal end;
   said bore extends through said intermediate piece and opens into a pressure measuring chamber enclosed by said measuring membrane, or diaphragm, its support and said intermediate piece under said measuring membrane, or diaphragm;
   in said pedestal, a centrally arranged further bore is provided extending parallel to its longitudinal axis and opening into said bore in said intermediate piece; and
   said bore in said intermediate piece and the therewith communicating further bore in said pedestal form a pressure supply line.

3. The pressure measuring device as claimed in claim 1, for registering absolute pressures, further comprising:
   an evacuated chamber under said measuring membrane, or diaphragm, completely sealed by said measuring membrane, or diaphragm, its support and said intermediate piece; and
   a blind bore provided in said intermediate piece, extending parallel to its longitudinal axis and opening pedestal end.

4. The pressure measuring device as claimed in claim 1, wherein:
   the outer diameter of said first cylindrical section exposed by said cavity is smaller than the outer diameter of said measuring membrane, or diaphragm.

5. The pressure measuring device as claimed in claim 1, wherein:
   said semiconductor pressure sensor is a sensor based on silicon;
   said intermediate piece is composed of silicon; and
   said pedestal is composed of metal or ceramic.

6. The pressure measuring device as claimed in claim 1, wherein:
   said intermediate piece and said pedestal are mechanically connected with one another by adhesive or solder.

* * * * *